Dec. 17, 1968

M. ALDEN 3,417,405

RECORDER

Filed Nov. 21, 1966

INVENTOR
MILTON ALDEN

BY *Donald S. Blodgett*
ATTORNEY

Dec. 17, 1968

M. ALDEN 3,417,405

RECORDER

Filed Nov. 21, 1966

MILTON ALDEN
INVENTOR

BY *Norman S. Blodgett*
ATTORNEY

United States Patent Office 3,417,405
Patented Dec. 17, 1968

1

3,417,405
RECORDER
Milton Alden, Needham, Mass., assignor to Alden
Research Foundation, Brockton, Mass., a trust of
Massachusetts
Filed Nov. 21, 1966, Ser. No. 595,723
9 Claims. (Cl. 346—145)

ABSTRACT OF THE DISCLOSURE

This invention relates to a recorder using electro-sensitized paper and, more particularly, to such a recorder in which the movable electrode is carried in a cover which is hingedly attached to a main body and in which the motor is mounted in the body and the movable electrode is driven by a shaft extending through the hinge.

---

It is well known in the communications field to transmit visual information (such as drawings, weather maps, or the like) by use of a signal of varying electrical intensity by radio transmission or by current transmission through wires. At the receiving end, a recorder is provided which passes a chemically treated strip of paper between scanning electrodes. The variations in electrical signal impressed on the electrodes cause variations in the darkness of a visible record produced by the electrical signal on the paper. Such recorders, however, have, in the past, been quite large and expensive and this has limited their use to sophisticated facilities such as are found in weather stations. One of the problems that has prevented the development of inexpensive recorders has been that of driving the electrodes without using very expensive mechanical power transmission devices. These and other difficulties experienced with the prior art devices have been obviated in a novel manner by the present invention.

It is, therefore, an outstanding object of the invention to provide a recorder which is inexpensive to manufacture and, therefore, is adaptable to widespread use.

It is another object of this invention to provide a recorder having a simple means for driving a movable electrode.

A further object of the present invention is the provision of a recorder which is simple in construction, inexpensive to manufacture, and which is capable of a long life of useful service with a minimum of maintenance.

It is another object of the instant invention to provide a compact recorder using the electrical, chemically-treated-paper principle.

With these and other objects in view, as will be apparent to those skilled in the art, the invention resides in the combination of parts set forth in the specification and covered by the claims appended hereto.

Figure 1:
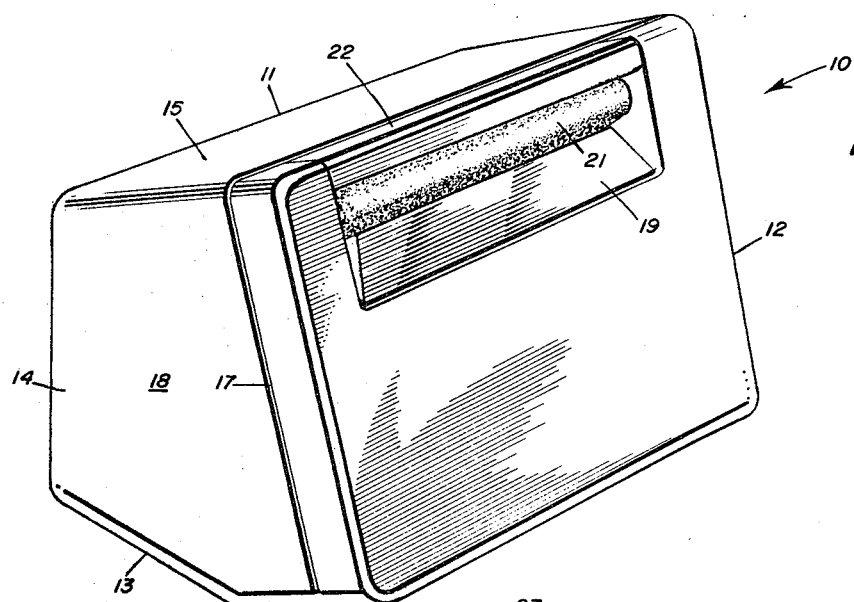
Figure 2:
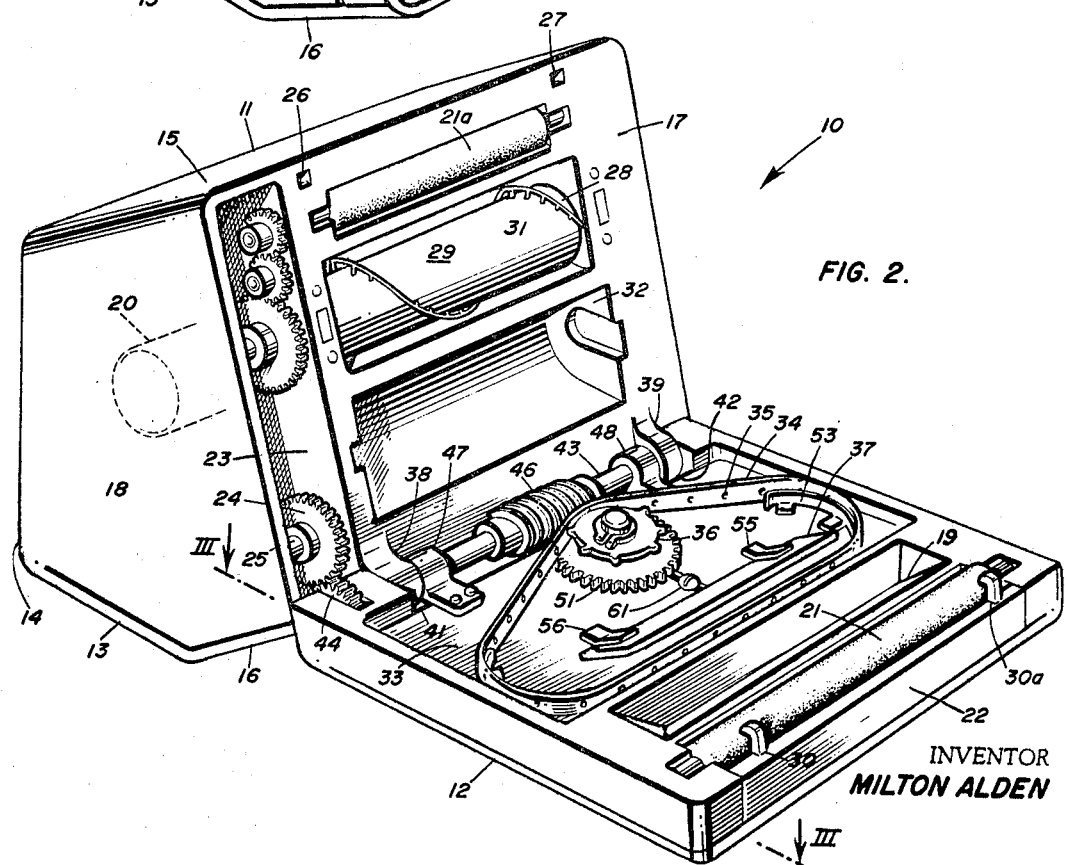
Figure 3:
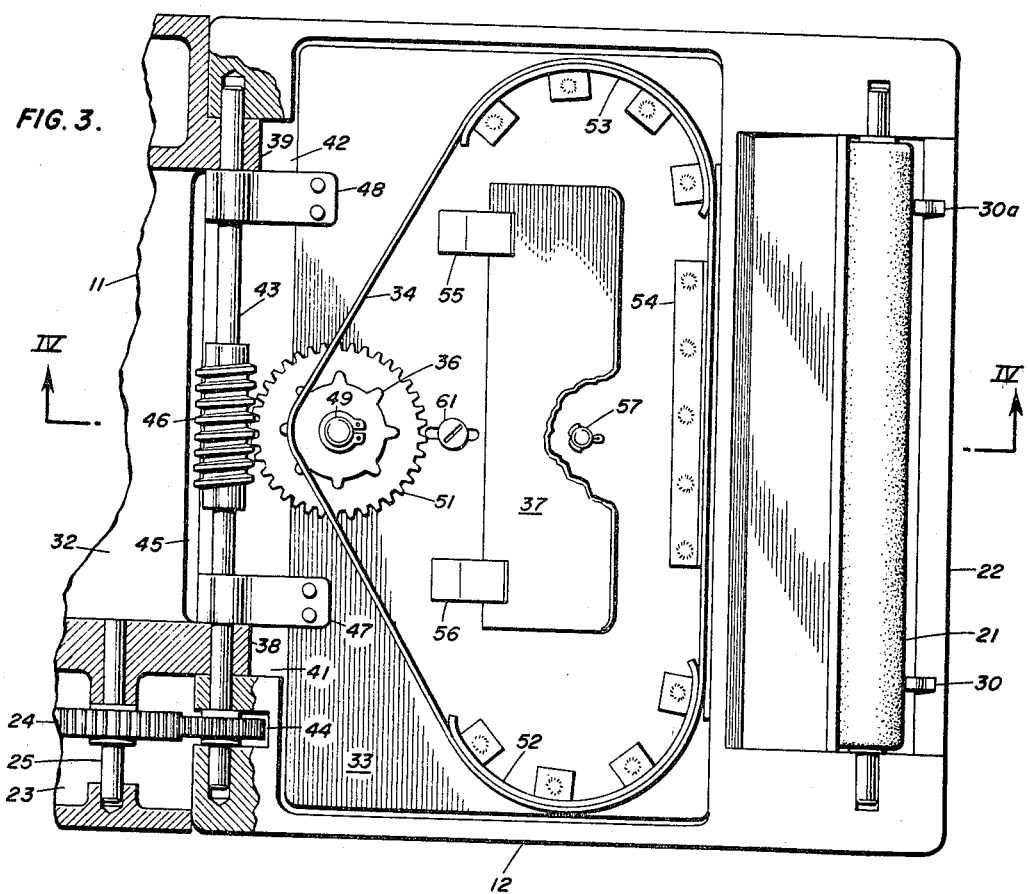

The character of the invention, however, may be best understood by reference to one of its structural forms as illustrated by the accompanying drawings in which:

FIG. 1 is a perspective view of a recorder embodying the principles of the present invention, FIG. 2 is a perspective view of the recorder with a cover open, FIG. 3 is a sectional view of the recorder taken on the line III—III of FIG. 2, and

2

Figure 4:
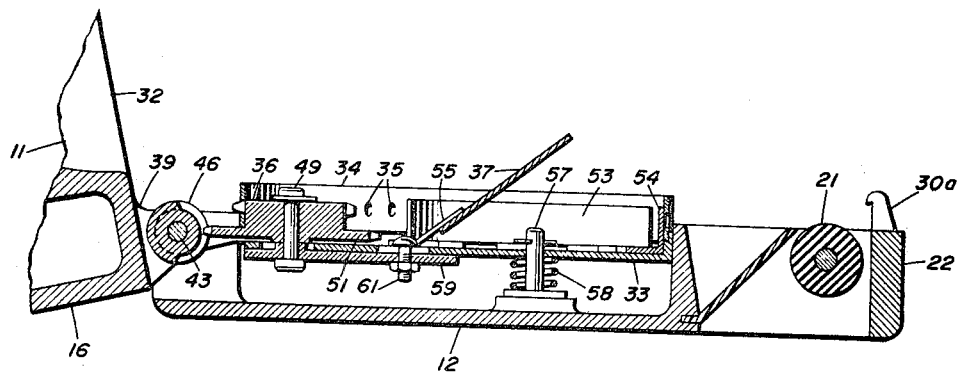

FIG. 4 is a vertical sectional view of a portion of the invention taken on the line IV—IV of FIG. 3.

Referring first to FIG. 1, wherein are best shown the general features of the invention, the recorder, indicated generally by the reference numeral 10, is shown as consisting of a main body 11 to which is fastened a cover 12. The main body is provided with a bottom surface 13, a vertical rear surface 14, an upwardly-and-forwardly inclined top surface 15, and and an upwardly-and-forwardly inclined front surface 16. It is also provided with an upwardly-and-rearwardly inclined front surface 17 against which the cover 12 lies, as well as vertical side surfaces such as the side surface 18. The upper part of the cover 12 is provided with a window 19 within which can be seen a roller 21. Overlying the window 19 and forming one edge thereof is a latch bar 22.

In FIG. 2, the cover 12 is shown in open, horizontal position, having been hingedly opened about a horizontal hinge axis generally parallel to the front surface 17 of the main body 11. Extending along the side surface 18 of the main body is a recess 23 containing a drive transmission mechanism connected to a motor 20. At the bottom of the recess is a pinion gear 24 mounted on a horizontal shaft 25. As is evident in the drawings, a roller 21a is partially recessed within the surface 17 of the main body 11. Above the roller are two recesses 26 and 27 adapted to be engaged, respectively, by fingers 30 and 29 associated with the latch bar 22. Underlying the roller 21a is a scanning electrode 28 consisting of a pivoted cylinder 29 on which is mounted a spiral wire 31. Finally, located below the electrode 28 is a semi-cylindrical recess 32 adapted to carry a roll of chemically-treated paper. This paper is of the type used in facsimile recording and carries chemicals which provide a visible trace when electrical current is passed through the paper from one electrode to another.

Located in the inside of the cover 12 is a support plate 33 on which is mounted an electrode 34. This electrode consists of a continuous band of metal provided with apertures 35 by which it is driven from a sprocket 36. Located within the loop of the electrode 34 is a pressure plate 37.

The details of the cover 12 and its associated equipment are shown in detail in FIGS. 3 and 4. The cover 12 is hingedly attached to the main body 11 by means of two fingers 38 and 39 which extend into corresponding slots 41 and 42 formed in the cover 12. A hinge shaft 43 extends horizontally through the cover 12 and through the fingers 38 and 39 to provide the hinging action. Keyed to the shaft 43 at one end is a gear 44 which engages the gear 24 mounted in the main body 11 and indirectly driven by the motor 20. Formed in the cover 12 adjacent the shaft 43 is a recess 45. In this recess on the shaft 43 is mounted a worm 46. Extending from the support plate 33 are bearing members 47 and 48 which embrace and provide a hinge support for the plate on the shaft 43. Finally, mounted in the plate is a jack shaft 49 on which is pivotally mounted the sprocket 36. Also mounted on the jack shaft 49 and connected to the sprocket 36 is a gear 51 which engages the worm 46 in driving engagement.

The electrode 34 is maintained in a three-lobed shape by the sprocket 36 at one corner and by shoes 52 and 53 at the other corners. A shoe 54 located adjacent the window 19 provides additional support.

As is evident in FIG. 4, the pressure plate 37 extends at a substantial angle to the plate 35 but is attached thereto by two thin metal tabs 55 and 56 which gives it a resilient action relative to the plate. Extending upwardly from the body of the cover 12 is a stud 57 which extends through the plate 33 and is provided at its upper end with a cotter pin. A coil spring 58 extends between the bottom surface of the plate and the inner surface of the cover 12 around the stud 57. The plate 33 is provided with a movable plate 59 which is fastened to it by a bolt 61. This plate 59 carries the jack shaft 49, the sprocket 36 and the gear 51 to permit adjustment.

The operation of the apparatus will now be readily understood in view of the above description. In setting up the recorder, the roll of sensitized paper is placed in the recess 32, it passes over the scanning electrode 28, over the roller 21a, and is carried back over the top surface 15 of the main body 11. The cover 12 is then closed, the fingers 30 and 29 snapping into the recesses 26 and 27 to hold it in place. When the motor 20 is actuated, the scanning electrode 28 is driven. At the same time, the gear 24 rotates, thus driving the gear 44 and the shaft 43. The rotation of the shaft 43 produces a similar motion of the worm 46 which drives the gear 51 and also the sprocket 36. The sprocket rotates and, by means of its teeth engaging the apertures 35 in the electrode 34, the band or loop electrode is moved around in its three-lobe pattern. The guide shoes 52, 53, and 54 serve to maintain it in place. When the cover 12 is in place, the pressure plate 37 engages the paper and presses it toward the electrode 28. The electrode 34 as it passes along the shoe 54 is relatively straight and engages to paper along a line opposite the axis of rotation of the cylinder 29 forming part of which the electrical signal is presented lies opposite this the scanning electrode 28. This means that the wire 31 to which the electrical signal is presented lies opposite this straight portion of the electrode 34 and the wire moves back and forth behind the paper opposite the line presented by the electrode 34 in the usual way, the signal being scanned back and forth across the paper along a straight line. The flow of electricity from the electrode 28 to the electrode 34 produces a visible message or diagram on the surface of the paper. Eventually, the paper is moved upwardly by the action of the roller 21a bearing against the roller 21 in the cover, so that the message is exposed in the window 19.

In order to open the cover for access to the interior, it is a simple matter of pressing the latch bar. The bar rotates about its axis and removes the fingers 30 and 29 from latching engagement with the apertures 26 and 27 in the main housing 11. The cover is then free to be moved down into the position shown in FIG. 2. The support plate 33 is hingedly supported on the shaft 43 by means of the bearing members 47 and 48 and at its outer end it is resiliently supported on the stud 57 by means of the coil spring 58. This causes the electrode 34 to press the paper against the electrode 28 with a predetermined force. The gear 51 can be brought into exact engagement with the worm 46 and the tension in the loop electrode 34 can be adjusted by means of the adjustability of the plate 59 relative to the main portion of the plate 33.

It can be seen that by use of the present invention it is possible to provide a recorder in which the scanning electrode and the opposing electrode are driven from the same motor, but in which the cover may be readily opened for access to the equipment. Nevertheless, the transmission means is relatively simple and inexpensive. The arrangement shown in the present invention permits providing a recorder which is small in size, compact and available for many uses. It is contemplated that a recorder of this type would be used in a large organization to permit the rapid transmission of non-verbal information, such as drawings and the like from one portion of the organization to the other very rapidly. The fact that the apparatus is inexpensive permits its wide use in this manner.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A recorder, comprising
   (a) a main body carrying a sweep electrode,
   (b) a cover connected to the main body for swinging motion about a hinge axis, the cover carrying a movable elongate electrode,
   (c) a motor mounted in the main body,
   (d) a drive shaft coaxial with the said hinge axis,
   (e) first drive means connecting the motor to the drive shaft, and
   (f) second drive means connecting the drive shaft to the movable electrode for the actuation thereof.

2. A recorder as recited in claim 1, wherein the movable electrode consists of a loop of metal strip, wherein one edge of the loop lies in a plane parallel to the general plane of the cover.

3. A recorder as recited in claim 2, wherein the second drive means consists of a worm mounted on the drive shaft, a stub shaft mounted on the cover and extending at a right angle thereto, and gear means rotatably mounted on the stub shaft meshing with the worm on the one hand and with the movable electrode on the other hand.

4. A recorder as recited in claim 3, wherein the gear means consists of a gear lying in a plane passing through the hinge axis and a sprocket mounted on the gear in a plane spaced and parallel to the gear, the sprocket having angularly-spaced pegs which engage apertures in the movable electrode in driving relationship.

5. A recorder as recited in claim 2, wherein a support table associated with the cover carries the movable electrode and is mounted for hinged motion about the said hinged axis, and wherein a spring extends between the table and the cover at a location substantially spaced from the said hinge axis.

6. A recorder as recited in claim 5, wherein the table is provided with a portion which is adjustable relative to the remainder and which carries a stub shaft carrying a sprocket forming part of the said second drive means.

7. A recorder as recited in claim 1, wherein the said first drive means comprises a gear mounted on the cover for rotation with the drive shaft and a gear mounted on the main body to be driven by the motor, the distance between the axes of the gears and the pitch circles of the gears being selected to permit the gears to be in driving relationship at a closed position of rotation about the hinge axis of the cover relative to the main body and to be separated at an open position.

8. A recorder, comprising
   (a) a main body carrying a sweep electrode,
   (b) a cover connected to the main body for swinging motion about a hinge axis, the cover carrying a movable elongate electrode,
   (c) a motor mounted in the main body and connected to drive the sweep electrode and the elongate electrode, and
   (d) a support table associated with the cover to carry the movable electrode, the table being mounted for hinged motion about the said hinged axis and having a spring which extends between the table and the cover at a location substantially spaced from the said hinge axis.

9. A recorder, comprising
(a) a main body carrying a sweep electrode,
(b) a cover connected to the main body for swinging motion about a hinge axis, the cover carrying a movable elongate electrode,
(c) a motor mounted in the main body and connected to drive the sweep electrode and the elongate electrode, and
(d) a sprocket mounted in the cover driven by the said motor and having angularly-spaced pegs which engage apertures in the movable electrode in driving relationship.

References Cited

UNITED STATES PATENTS

| | | | |
|---|---|---|---|
| 2,621,999 | 12/1952 | Alden | 346—101 X |
| 2,655,427 | 10/1953 | Alden | 346—74 |
| 2,789,029 | 4/1957 | Alden | 346—145 |

RICHARD B. WILKINSON, Primary Examiner.

J. W. HARTARY, Assistant Examiner.

U.S. Cl. X.R.

346—74, 101